Dec. 10, 1963 D. W. OSBORNE 3,113,466
INTERNAL SHOE DRUM BRAKES
Filed Dec. 28, 1961 2 Sheets-Sheet 1

*INVENTOR*
DUNCAN W. OSBORNE
BY Lawrence J. Winter
*ATTORNEY*

Dec. 10, 1963  D. W. OSBORNE  3,113,466
INTERNAL SHOE DRUM BRAKES
Filed Dec. 28, 1961  2 Sheets-Sheet 2

INVENTOR
DUNCAN W. OSBORNE
BY *Lawrence J. Winter*
ATTORNEY

United States Patent Office 3,113,466
Patented Dec. 10, 1963

3,113,466
INTERNAL SHOE DRUM BRAKES
Duncan W. Osborne, Leamington Spa, England, assignor to Automotive Products Company Limited, Leamington, England
Filed Dec. 28, 1961, Ser. No. 162,692
7 Claims. (Cl. 74—110)

This invention relates to internal shoe drum brakes and has for its object to provide an improved construction of brake shoe expanding mechanism of the kind incorporating an actuating member and rollers arranged to co-act with complementary inclined surfaces provided on the actuating member and either on the brake shoes or on members associated therewith.

In accordance with the invention in a brake shoe expanding mechanism of the kind above referred to the rollers are mounted in a cage carried by the actuating member each roller having bearing portions at its opposite ends for location in roller supporting slots in the cage. Contact between the ends of the rollers and the opposite surfaces of the cage will prevent the rollers from tilting and means are advantageously provided for ensuring that the rollers are parallel to one another and in alignment side by side when the actuating member is in the limit position corresponding to brake off. The cage may be formed integral with the actuating member or made as a separate unit for attachment thereto either permanently or so as to be removable. For example the cage can be formed as a stamping in sheet metal, the cage with rollers assembled therein being secured to the actuating member by rivetting.

An embodiment of the invention will now be described by way of example by aid of the accompanying drawings in which.

Figure 1:
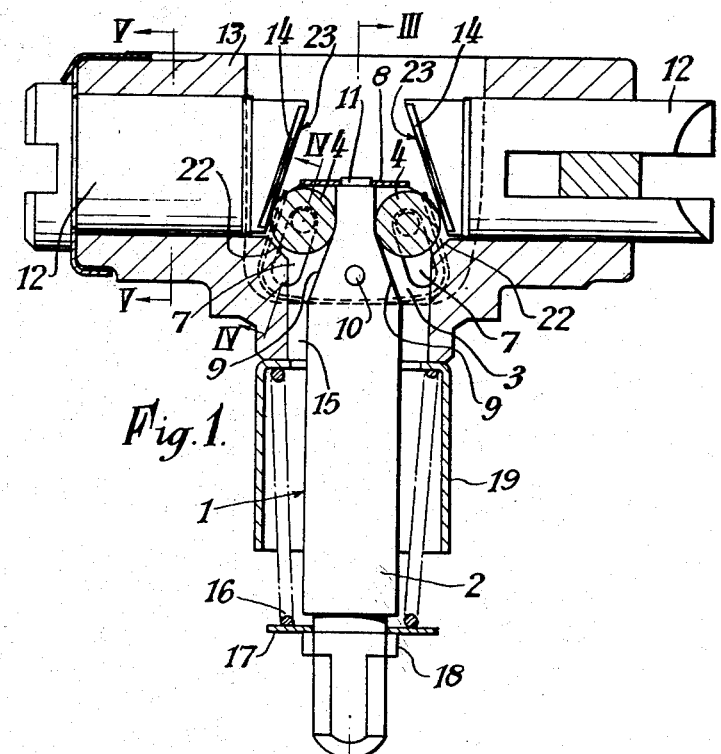
FIGURE 1 is a sectional view showing a construction of brake shoe expanding mechanism of the present invention suitable for use in a brake assembly in which the brake shoes are expanded by tappets.
Figure 2:
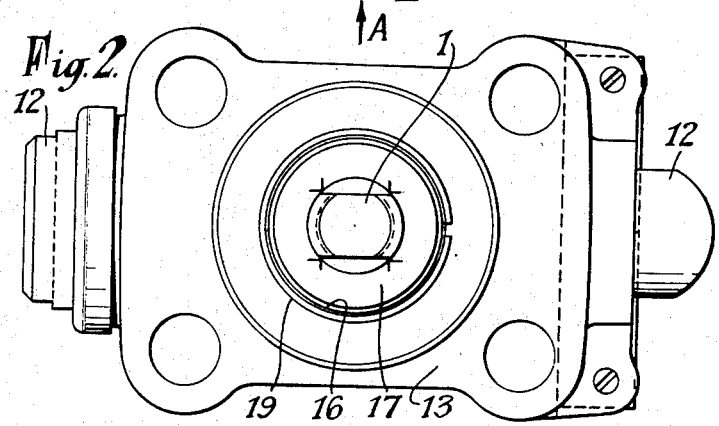
FIGURE 2 is a view as seen in the direction of arrow A in FIGURE 1.
Figure 3:
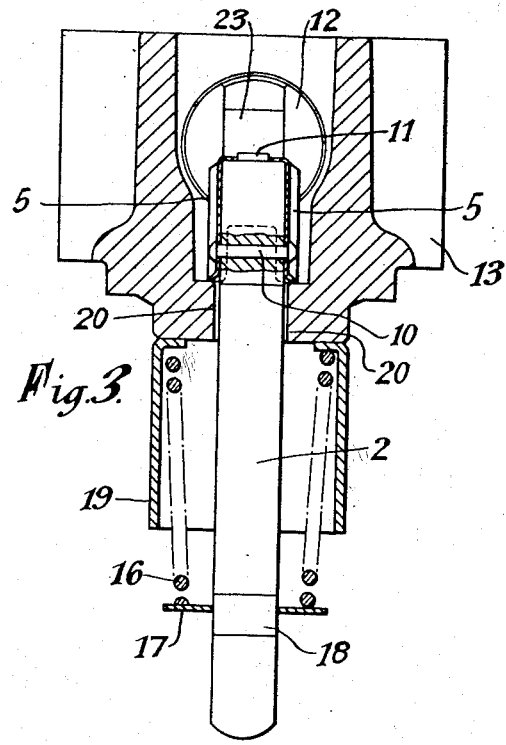
FIGURE 3 is a section on the line III—III of FIGURE 1.
Figure 5:
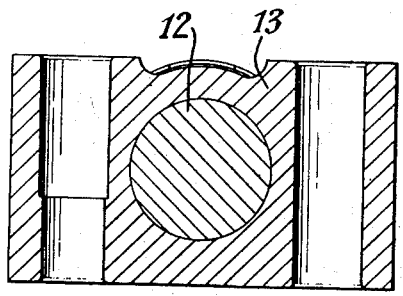
FIGURE 5 is a section on the line V—V of FIGURE 1.
Figure 4:
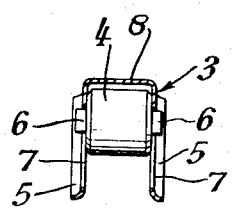
FIGURE 4 is a fragmentary section on the line IV—IV of FIGURE 1.

Referring to the drawings, the actuating member consists of a plunger 1 a portion 2 of the length of which is of rectangular cross-section. Carried by the plunger is a cage unit shown generally at 3 and consisting of a channel section member having a pair of rollers 4 extending axially between the side plates 5 of the cage, the opposite ends of each roller being reduced in diameter to provide bearing portions 6 which extend through slots 7 in the side plates of the cage to support the rollers therein. The pairs of slots 7 are spaced apart from one another and extend outwardly from the closed end 8 of the cage and are inclined to one another, the slots converging as they approach the closed end of the cage. The cage unit is mounted on the plunger by inserting one end of the plunger between the side plates with the rollers located one on either side of the plunger the roller peripheries each being in contact with an inclined surface 9 formed on the appropriate side of the plunger said inclined surfaces extending parallel to the roller supporting slots 7 of the cage. The cage unit 3 is secured to the plunger 1 by a rivet 10 and is prevented from swinging about the rivet by the location of a spigot 11 on the plunger in a hole in the closed end 8 of the cage.

In the brake assembly, the brake shoes not shown in the drawings, are expanded by tappets 12 slidably mounted in a tappet housing 13 adapted to be bolted to the brake back plate also not shown, the cage carrying end of the actuating member is located in the tappet housing 13 with the roller peripheries each in contact with the complementary inclined surface 14 on the inner end of the appropriate tappet the plunger extending out of the housing through an aperture 15 in the wall so that the same can slide in opposite directions from the normally retracted position corresponding to "brake off," inwardly of the housing to effect displacement of the tappets and movement of the brake shoes against the brake pull off springs.

The aperture 15 in the tappet housing is in the form of an elongated slot through which the plunger projects, the length of the slot being such that the plunger can swing from side to side in a plane normal to the axis of the rollers, and the width such that the slot edges 20 engage the opposite faces of the actuating member to form guides for the plunger. At the inner end of the aperture 15 the tappet housing is formed to provide two abutments 22 disposed one at each side of the aperture. The abutments 22 are angularly disposed and limit the outward displacement of the rollers when the actuating member is in a fully retracted position. This ensures that the rollers are maintained in phase.

The plunger is urged outwardly of the tappet housing by a compression spring 16 one end of which bears against an abutment plate 17 supported against axial displacement by a shoulder 18 on the plunger 1, the opposite end of the spring bearing against the tappet housing a cover 19 extending partially over the length of the spring.

The inclined surface at the end of each tappet 12 is relieved at either side leaving a central portion 23 or track for each roller 4, the relieved portions providing clearance permitting the side flanges of the roller cage to be extended thus increasing the bearing area contacted by the roller ends whereby added security against roller tilting is produced.

The tappet housing 13 can be made as a casting preferably a die casting thus facilitating the formation of the guide surfaces provided by opposite edges of the aperture and also the abutments 22. The aperture can extend through the tappet housing the open end opposite to that through which the plunger projects being closed by a removable cover plate, not shown, held in position by fixing bolts securing the tappet housing to the brake back plate, the tappet housing having holes 24 to receive the fixing bolts.

The cage can be formed integral with the plunger or made as a separate unit for attachment thereto either permanently or so as to be removable. For example the cage can be formed as a stamping in sheet metal, the cage with rollers assembled therein being secured to the plunger by rivetting as shown for example, in the drawings.

I claim:

1. A brake shoe expanding mechanism comprising a tappet housing having a recess therein, aperture means in said housing communicating with the bottom of said recess, slidable tappet members disposed in said housing in alignment with each other and extending through and into opposite sides of said recess, said tappet members having inclined roller contact surfaces disposed to converge toward each other in a direction extending away from the bottom of the recess, a roller cage in said recess between said tappet members having oppositely disposed parallel side walls, said walls extending in planes parallel to the axes of said tappet members, each said cage side wall having elongated slots therein disposed adjacent its opposite ends, said slots extending substantially parallel to the inclined surface of the adjacent tappet member with the slots converging toward each other in a direction extending away from the bottom of said recess, a roller member with pin means extending into said slots carried in the opposite ends of the cage side walls, said roller members having axes parallel to the planes of the tappet members roller contact surfaces, said pin means being secured in said slots so said roller members can slidably move the full length thereof and have relative slidable movement with respect to each other, said roller members being disposed to engage the inclined surface of the adjacent tappet member, an actuating member secured to said cage for moving said cage and roller members, said actuating member extending through said aperture means and into the bottom of said recess, a portion of said actuating means being disposed between said roller members and said cage side walls with said portion having inclined surfaces on opposite sides thereof extending parallel to the adjacent roller member supporting slot and the adjacent roller member being in contact with said adjacent portion inclined surface, said aperture means having a dimension substantially larger than the dimension of said actuating means in a direction extending parallel to the axes of said tappet members so the actuating member can swing from side to side in a plane normal to the axes of the roller members.

2. A brake shoe expanding mechanism according to claim 1 wherein the cage is made as a separate unit for attachment to the actuating member.

3. A brake shoe expanding mechanism according to claim 1, wherein the cage unit is secured to the actuating member so as to be removable therefrom.

4. A brake shoe expanding mechanism according to claim 1, wherein the actuating member is slidably supported by said housing adapted for attachment to the back plate of a brake assembly, each said roller member being disposed so that its periphery coacts with the inclined surfaces of the adjacent tappet member.

5. A brake shoe expanding mechanism according to claim 1, wherein the inclined surfaces of the tappet members are relieved to provide a central portion engageable by the adjacent roller member periphery and a clearance at either side for adjacent portions of the cage.

6. A brake shoe expanding mechanism according to claim 1, wherein the housing is provided with abutments engageable by the roller member peripheries at the limit position of the actuating member.

7. A brake shoe expanding mechanism according to claim 1, wherein the housing is provided with guide means for the actuating member.

References Cited in the file of this patent

UNITED STATES PATENTS

| | | |
|---|---|---|
| 2,077,931 | Irving | Apr. 20, 1937 |
| 2,124,785 | La Brie | July 26, 1938 |
| 2,271,815 | Cowell | Feb. 3, 1942 |
| 2,995,217 | Van Ber Plas | Aug. 8, 1961 |

FOREIGN PATENTS

| | | |
|---|---|---|
| 599,541 | Great Britain | Mar. 15, 1948 |
| 935,769 | Germany | Nov. 24, 1955 |